US006710579B2

(12) United States Patent
Ebel et al.

(10) Patent No.: US 6,710,579 B2
(45) Date of Patent: Mar. 23, 2004

(54) STARTER-GENERATOR DEVICE FOR INTERNAL COMBUSTION ENGINES AND METHOD FOR OPERATING THE DEVICE

(75) Inventors: Peter Ebel, Steinkirchen (DE); Andreas Schwarzhaupt, Oberrot (DE); Gernot Spiegelberg, Heimsheim (DE); Volker Wilhelmi, Wernau (DE); Joerg Zuern, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/963,557

(22) Filed: Sep. 27, 2001

(65) Prior Publication Data

US 2002/0125861 A1 Sep. 12, 2002

(30) Foreign Application Priority Data

Sep. 27, 2000 (DE) ........................................ 100 47 755

(51) Int. Cl.[7] .................................................. H02K 7/02
(52) U.S. Cl. .............................................. 322/4; 310/74
(58) Field of Search ................................ 322/4; 74/572, 74/574; 310/74

(56) References Cited

U.S. PATENT DOCUMENTS

| | | | | |
|---|---|---|---|---|
| 3,609,426 A | * 9/1971 | Gaul | 322/4 |
| 4,411,171 A | * 10/1983 | Fiala | 475/5 |
| 4,439,720 A | * 3/1984 | Georges | 322/4 |
| 4,499,965 A | * 2/1985 | Oetting et al. | 180/165 |
| 4,965,998 A | * 10/1990 | Estigoy et al. | 60/325 |
| 5,755,302 A | * 5/1998 | Lutz et al. | 180/652 |
| 5,821,630 A | * 10/1998 | Schutten | 290/30 R |
| 6,098,584 A | * 8/2000 | Ahner et al. | 123/179.3 |
| 6,133,716 A | * 10/2000 | Schutten | 322/40 |
| 6,202,776 B1 | * 3/2001 | Masberg et al. | 180/65.2 |
| 6,365,983 B1 | * 4/2002 | Masberg et al. | 290/40 C |
| 6,507,128 B2 | * 1/2003 | King et al. | 290/40 C |

FOREIGN PATENT DOCUMENTS

| | | |
|---|---|---|
| DE | 19632074 | 2/1998 |
| DE | 19811245 | 9/1998 |
| DE | 19800056 | 7/1999 |

* cited by examiner

*Primary Examiner*—Nicholas Ponomarenko
*Assistant Examiner*—Julio R. Gonzalez
(74) *Attorney, Agent, or Firm*—Crowell & Moring LLP

(57) ABSTRACT

A device with a starter-generator for internal combustion engines, the combustion engine having a centrifugal mass for stabilizing its smoothness of running, with at least one first nonpositive clutch and a flywheel generator, which can be actuated by means of an electrical energy source and is in effective connection with a selectable gearbox, the non-positive clutch being provided between the flywheel generator, which can be actuated by means of an electrical energy source, and the combustion engine, and the flywheel generator forming the centrifugal mass of the combustion engine.

8 Claims, 1 Drawing Sheet

STARTER-GENERATOR DEVICE FOR INTERNAL COMBUSTION ENGINES AND METHOD FOR OPERATING THE DEVICE

BACKGROUND AND SUMMARY OF THE INVENTION

This application claims the priority of German patent Document 100 47 755.0, filed Sep. 27, 2000, the disclosure of which is expressly incorporated by reference herein.

The present invention relates to a starter-generator device for internal combustion engines and a method for operating the device.

German Patent DE 19632074 C2 discloses a starting device for internal combustion engines with at least one first nonpositive clutch and a starter-generator that can be actuated by means of an electrical energy source and is in effective connection with a selectable gearbox. The nonpositive clutch is positioned after the flywheel generator and ahead of the gearbox. This has the disadvantage that the generator cannot be switched on to synchronize the gearbox in the state decoupled from the engine and the generator cannot start an engine with a high breakaway torque.

An object of the invention is to design and arrange the starter-generator device in such a way that it is possible to omit components from the drive train and that even engines with a higher starting torque than that of the starter-generator can be started.

According to the invention, this object is achieved by providing at least one nonpositive clutch is provided between a flywheel generator, which can be actuated by means of an electrical energy source, and a combustion engine. The flywheel generator forms the actual centrifugal mass of the combustion engine.

One particular advantage of the invention is that the flywheel generator can break away a combustion engine that has a considerably higher breakaway torque than the torque of the flywheel generator in the starting state with the flywheel generator stationary, in which it would also have to crank the engine from stationary. It is thus also possible to crank the engine from the stationary condition of the engine by means of the already rotating generator.

Another advantage is that the flywheel generator can be used to synchronize the gearbox. When changing up to a higher gear, the gearbox input shaft can be braked by the flywheel generator until the desired rotational speed has been reached.

Another advantage is that almost wear-free operation of the friction clutch between the flywheel generator and the combustion engine is possible because it can be assisted during the process of driving away by the action of the flywheel generator and, given appropriate dimensioning, can be closed almost without a speed difference.

In a preferred development of the invention, specifically in the passenger-car sector, a vehicle can drive either forwards or backwards in first gear, thus making it possible to omit the customary intermediate shaft for reverse gear in a customary change-speed gearbox. This represents a considerable simplification of the gearbox and weight savings in the drive train.

In another advantageous refinement, use is made of a gearbox in which a positive clutch is arranged on the input shaft. In interaction with the flywheel generator, this makes it possible to produce a particularly compact and inexpensive drive train.

Another advantage of the invention is that the flywheel generator can convert braking energy of the vehicle into other types of energy and thus serves as a wear-free brake.

It is furthermore possible to operate the flywheel generator as a starter or a generator respectively, making it possible to omit units.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
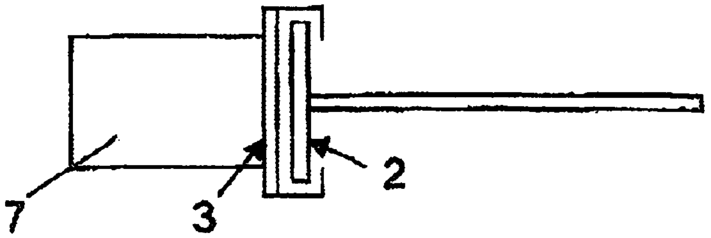
FIG. 1*a* shows a combustion engine with a centrifugal mass in accordance with the prior art
Figure 1B:
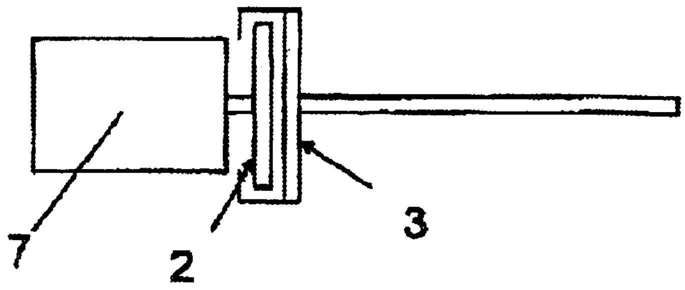
FIG. 1*b* shows a combustion engine with a detachable centrifugal mass in accordance with the invention.

FIG. 1*a* gives a detail view of a conventional arrangement of a combustion engine 7 with its centrifugal mass 3 in accordance with the prior art. The centrifugal mass 3 is connected directly to the crankshaft of the combustion engine 7 and ensures that the combustion engine 7 operates with adequate smoothness. The centrifugal mass 3 can be decoupled from the remainder of the drive train by means of a friction clutch 2. To drive away, the engine is started and the friction clutch 2 is closed, for example, with the centrifugal mass 3 serving as a pressure plate for the friction clutch 2. FIG. 1*b* illustrates an arrangement in accordance with the invention. It is reversed compared with that in FIG. 1*a*, with the friction clutch 2 now being mounted between the crankshaft of the combustion engine 7 and the centrifugal mass 3, so that the centrifugal mass 3 of the combustion engine 7 can now be decoupled from the latter. Now that it is decoupled from the engine, the centrifugal mass can also be supplied with current like an electric machine with a rotor and a stator and can be accelerated electrically as a flywheel and produce a positive or negative torque, depending on the direction of the current. In generator mode, energy can be withdrawn and braking torque can thus be produced. In principle, the direction of rotation of the centrifugal mass can also be changed according to the direction of the current.

Figure 2:
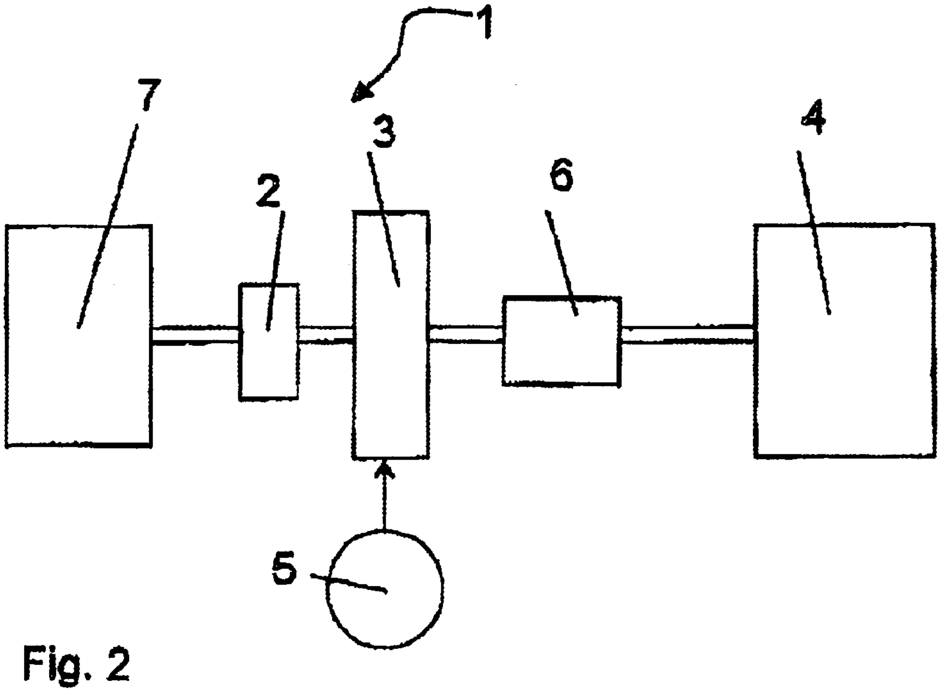
FIG. 2 shows a preferred arrangement of the device according to the invention with an additional dog clutch.

FIG. 2 shows a drive arrangement for internal combustion engines in the form of block diagrams and shows a combustion engine 7, which can be connected, for driving a flywheel generator 3 by means of a friction clutch 2. As illustrated in FIG. 1*b*, this flywheel generator 3 forms the actual centrifugal mass of the combustion engine 7.

The flywheel generator 3 can be separated from the crankshaft (not shown) of the combustion engine 7 by opening the clutch 2. The flywheel generator 3 can be accelerated by means of a source of energy 5, preferably the vehicle's battery, or an electric starter motor. If the flywheel generator 3 is driven by a starter motor, it can be flanged to it by means, for example, of a transmission leading to a speed increase by means of gears. However, the flywheel generator 3 preferably takes over the function of the starter of the vehicle and, for this purpose, is supplied with current by the vehicle's battery.

The flywheel generator 3 is effectively connected with an unsynchronized selectable gearbox 4. The gearbox 4 has a gearbox input shaft (not shown) and, as a main shaft, a gearbox output shaft (not shown), which interact in the customary manner with a layshaft (not shown). In addition, there can also be an intermediate shaft for reverse gear, as is customary. The gearbox 4 can also be a non-coaxial gearbox with only an input shaft and an output shaft.

In a preferred development of the invention, the flywheel generator 3 is connected to the change-speed gearbox 4 in terms of drive by means of a further clutch 6, preferably a positive clutch, e.g. a dog clutch. The use of this arrangement is particularly preferred in vehicles in which the gearbox 4 further down the drive train or other units have very high drag torques when cold-starting, as, for instance, in trucks. The further clutch 6 is particularly advantageous when the drag torque of the gearbox 4 is too high when cold-starting the combustion engine, owing to the temperature-related high viscosity of the transmission fluid for example, and the drag torque, which is caused by the shafts and gears of the gearbox, needs to be decoupled for starting. This is advantageous, particularly in the case of trucks.

In the case of a low drag torque or even when warm-starting, when the viscosity of the transmission fluid is low, an additional clutch 6 ahead of the gearbox 4 can be dispensed with or it can be kept closed. To start the engine when the vehicle is stationary, it is then also possible to divide the drive train within the gearbox 4 at the input shaft or, by means of idling, at the main shaft by shifting the gearbox 4 to neutral.

Specifically in the latter case, the moment of inertia and the centrifugal mass of the arrangement can be increased, especially for the process of starting the combustion engine 7, since the rotatory mass of the gearbox input shaft or the layshaft can be used as well, depending on the location of installation of the separating clutch. Admittedly, the drag torque, which is unwanted per se, increases with the centrifugal mass. However, depending on the drag torque inherent in the design, a suitable point of installation for the separating clutch between the flywheel generator 3 and the gearbox input shaft and/or layshaft that results in an advantageous ratio of effective centrifugal mass to drag torque can be selected.

The device 1 according to the invention can be constructed as a compact starter-generator unit with the friction clutch 2 and the dog clutch 6 that may be present, which is arranged between the crankshaft of the combustion engine 7 and the gearbox 4.

One particularly preferred option is to arrange a dog clutch on the gearbox input shaft and to construct the gearbox 4 as the preferred dog-type constant-mesh layshaft gearbox. This is a very compact option and can eliminate the need for the separately arranged dog clutch 6.

In the past, consideration has been given to combining the starter in the motor vehicle with the generator to give a starter-generator unit in order in this way to eliminate one of these two units. For reasons of cost, this has not hitherto been a worthwhile possibility, especially in the truck sector, since the starter-generator unit, consisting of a flywheel generator, would have to be of very large dimensions to enable it to crank the combustion engine from stationary. In this case, however, there would be a considerable reduction in the efficiency of the starter-generator unit in generator mode. This applies especially to trucks, in which the breakaway torque of the combustion engine is considerably higher than that of a passenger car, that is to say that they in fact require a very much larger starter-generator for starting than would a passenger car, for instance.

At the same time, the breakaway torque of the passenger car corresponds approximately to a power requirement equal to that of the electrical loads in the vehicle's electrical system. A starter-generator in a passenger car can therefore be dimensioned adequately for both applications.

However, the breakaway torque of a truck can be higher by a factor of up to about 10 than that of a passenger car. On the other hand, the requirement for electric power in the two classes of vehicle is approximately equivalent, and hence the generators of passenger cars and trucks are approximately equivalent in terms of their electric power.

However, this means that a starter-generator that is adequately dimensioned for starting a truck would simultaneously be far too large as a generator and would operate essentially only in the part-load range with an unfavourable efficiency. This leads, however to unnecessary costs and excessive weight and hence to increased fuel consumption. With increasing engine power, a conventional solution of this kind is therefore no longer worthwhile for trucks.

According to the invention, however, the flywheel generator 3, which is designed to be adequate for supplying the vehicle's electrical system, can also start a combustion engine 7 that has a significantly higher breakaway torque than the torque of the flywheel generator 3 when starting from stationary. When starting from stationary, the only source of power available to the flywheel generator is the torque generated by the supply of current to the flywheel generator. This would not be enough to overcome the breakaway torque of the high-power combustion engine 7 and crank it as well.

For purposes of starting, the invention specifies that the flywheel generator 3 be separated from the friction clutch 2 and from unwanted drag torques of the gearbox 4 before starting the combustion engine 7. For this purpose, the dog clutch 6, where present, is opened or the gearbox 4 is decoupled by opening gearbox clutches in a preferred dog-type constant-mesh layshaft gearbox 4 or the gearbox 4 is shifted to neutral. Briefly decoupling the centrifugal mass of the engine from the crankshaft allows the flywheel generator 3 to be supplied with current by the source of energy 5 until it has accelerated to a high speed (specified speed) and then the combustion engine 7 to be started by means of the breakaway torque of the rapidly rotating centrifugal mass by closing the friction clutch 2 as quickly as possible. The flywheel generator 3 preferably continues to be supplied with current in order to crank the combustion engine 7 and counteract the drop in the kinetic energy of the flywheel generator 3.

The combustion engine 7 is then once more separated mechanically from the flywheel generator 3 for a brief period by briefly reopening the friction clutch 2 and running the flywheel generator 3 down until it is approximately stationary in order to connect up the gearbox 4, either by supplying the flywheel generator 3 with current in the opposite direction or discharging energy into a storage device, a resistor or the like. The gearbox 4 is connected up by closing the dog clutch 6 positively or closing the gearbox clutches. The friction clutch 2 between the combustion engine 7 and the flywheel generator 3 is then closed again. As a result, the torque of the combustion engine can now be passed through into the gearbox 4 since the gearbox 4 has now been reincorporated into the drive train or connected up. The smooth running of the combustion engine 7 is now once again stabilized by the centrifugal mass of the flywheel generator 3. During subsequent driving, the dog clutch 6 is preferably kept closed.

If the intention is to stop the vehicle in this state with the combustion engine 7 running, the gearbox 4 must be shifted to neutral. A drive train control system is provided for this purpose, controlling the dog clutch 6 and/or the gearbox 4 with or without a dog clutch arranged on the input shaft in the gearbox 4, the speed and torque of the combustion engine 7 and the speed and torque of the flywheel generator 3 depending on the driver's requirements and rotational-speed ratios.

The vehicle can be driven away in such a way that the idling speed of the combustion engine 7 is maintained and the friction clutch 2 is closed slowly. If the power supplied by the combustion engine 7 is not sufficient for driving away, the engine speed is increased accordingly.

However, it is especially advantageous to supply the flywheel generator 3 with current when driving away in order thereby to supplement by means of the flywheel generator 3 the drive-away torque to be built up via the clutch 2. Especially in the passenger-car sector, the vehicle can be accelerated in a particularly advantageous manner to the matching rotational speed by means of the flywheel generator 3 alone, and the clutch 2 can then be closed without there being a difference in rotational speed. This makes it possible to operate the clutch 2 almost without wear. In addition, this version makes it possible to eliminate an involved clutch control system for the friction clutch 2 since this now has essentially only to be able to open and close as quickly as possible.

The device according to the invention has the advantage that the flywheel generator 3 can be used to accelerate the drive train up to the synchronous idling speed of the combustion engine 7. This makes it possible to operate the friction clutch 2 without a difference in rotational speed. There is virtually no wear on the clutch 2 over the entire life of the vehicle.

Thanks to the possibility of decoupling the crankshaft from the centrifugal mass of the combustion engine 7 formed by the flywheel generator 3, at least briefly, by means of the friction clutch 2, the same flywheel generator 3 can also be used to synchronize the change-speed gearbox or dog-type constant-mesh layshaft gearbox 4 further down the drive train without having to take into account the remaining rotatory mass of the engine crank mechanism at the same time. This makes the system highly dynamic.

As already described, the installation, between the flywheel generator 3 and the gearbox 4, of a dog clutch 6 that can be operated when there is synchronism between the gearbox input shaft and the flywheel generator 3 or in the stationary condition is advantageous if the drag torque of the gearbox 4 is too high, this being a preferred development of the invention. This makes it possible for the input shaft of the gearbox 4 to be decoupled during the process of starting the combustion engine 7 and for the centrifugal mass of the flywheel generator 3 alone to be accelerated to the desired rotational speed.

If a separable connection between the input shaft and the layshaft gear mounted on the input shaft is arranged on the input shaft at the input of the gearbox, the dog clutch 6 further up the drive train, between the flywheel generator 3 and the gearbox 4, can be omitted. Moreover, if the drag torques of the layshaft and the input shaft in the gearbox 4 are so low, when driven by the flywheel generator 3, that they only reduce the final rotational speed of the flywheel generator 3 for starting the combustion engine 7 to a negligible extent, both the dog clutch 6 ahead of the gearbox input and a dog clutch on the gearbox input shaft can be omitted entirely. In this case, all that is required for the starting operation is to ensure that neutral is selected in the gearbox 4.

With the device according to the invention and the corresponding method, it is also a simple matter to synchronize the unsynchronized gearbox 4 driven by the combustion engine 7 while driving. If the friction clutch 2 is a mechanical clutch, it can remain continuously closed while driving and need only be opened to start the combustion engine 7 when the vehicle is stationary and for selecting first gear to drive the vehicle away if it has not already been possible to accelerate the latter to the synchronization speed of the clutch by the starter-generator.

Synchronization is accomplished by means of the flywheel generator 3 and appropriate control of the combustion engine 7 by matching the rotational speed of the input shaft/layshaft and gears to the rotational speed of the main shaft. The gear in the dog-type constant-mesh layshaft gearbox 4 can now be engaged when synchronized.

In the case of a mechanical friction clutch 2, which is operated by the driver using a clutch pedal, the gears are changed up with the friction clutch 2 closed. The engine torque is adjusted by the drive train control system until the drive train is load-free. As a result, there is no stress on the gears in the gearbox 4 and the preferably automated gear change system selects neutral, with the result that there is no longer any drive through to the main shaft. The gearbox input shaft is now braked since the transmission ratio is lowered when changing up. In order to brake the layshaft until this synchronization speed is reached, it is advantageous if the required lower rotational speed of the input shaft is reached as quickly as possible. For this purpose, the full engine torque can be set to zero and/or, in addition, energy can be withdrawn from the flywheel generator 3 or it can be supplied with current in the opposite direction. Once the synchronization speed has been reached, the higher gear is selected and the engine torque and the braking measures are established. The engine torque of the combustion engine 7 is thus transmitted to the driven axle again.

In the case of an automated friction clutch 2 that is controlled in a fully automatic manner, upshifting is performed with the friction clutch 2 open. The braking of the gearbox input shaft is accomplished quickly since the rotatory mass of the crank mechanism is decoupled and the shaft can be braked to the synchronization speed very quickly with the flywheel generator 3. When closing the clutch 2, it is advantageous to increase the speed of the combustion engine 7 and match it to the speed of the gearbox. This allows the friction clutch to be closed without a difference in speed and hence very gently.

When changing down, the sequence for a mechanical and automated friction clutch is essentially the same. The friction clutch remains closed. The engine torque is adjusted until the drive train is load-free. The gear is disengaged and the rotational speed of the layshaft is raised to that of the gear that is to be selected in the gearbox 4 by increasing the engine torque accordingly. The lower gear is engaged and the engine torque is released. To promote quicker selection, the combustion engine 7 can also be accelerated by the flywheel generator 3. Synchronization with the clutch 2 closed is advantageous during the downshift operation since the engine torque can be used to accelerate the gearbox input shaft instead of the torque of the flywheel generator 3.

Synchronization of the gearbox 4 both when the friction clutch 2 is open and when it is closed also depends essentially on the dynamics of the engine control system and the endurance of the engine braking function or on the endurance of the clutch operating system. Synchronization with the automated friction clutch 2 open when changing up is advantageous if as dynamic braking of the layshaft by the flywheel generator 3 as possible is desired. It is possible to avoid retardation by the inertia of the combustion engine 7.

The arrangement according to the invention furthermore has the additional great advantage that the gearbox 4 can be simplified by dispensing with an intermediate shaft for the reverse gear. In the case of passenger cars, reversing can preferably be accomplished in a simple manner, expediently by opening the friction clutch 2, expediently while the vehicle is stationary and preferably with the combustion engine 7 idling or stationary, and supplying the flywheel generator 3 with current in the opposite direction, allowing it to rotate in the opposite direction in comparison with forward travel once first gear has been engaged. Since the input shaft and hence also the output shaft are now driven by the flywheel generator 3, which is running in reverse, the vehicle travels backwards in first gear with electric drive. This makes the gearbox 4 considerably simpler and less costly. It does not matter here that the combustion engine 7 is now running without an actual centrifugal mass since, on the one hand, the vibrations of the combustion engine 7, which runs in an irregular manner, are not transmitted to the drive train because the friction clutch 2 is open and, on the other hand, the mass of the crank mechanism stabilizes the engine somewhat. Moreover, the idling speed of the combustion engine 7 can be increased to prevent the engine from stopping or it is deliberately stopped temporarily in order then to be restarted with almost no noise by the flywheel generator 3 for forward travel.

The device according to the invention can furthermore also be used in a vehicle with four-wheel drive, in which the first axle is driven by the combustion engine 7 and/or the flywheel generator 3 and the second axle is driven by an alternative drive. This drive can assist the flywheel generator 3 in the various operating states.

According to a preferred embodiment of the solution according to the invention, provision is made for the flywheel generator 3 to be designed as a wear-free brake.

It is particularly advantageous to construct the friction clutch 2 and the flywheel generator 3 as a compact starter-generator subassembly that can be inserted in a space-saving manner between the engine 7 and the gearbox 4. If a positive clutch 6 is provided ahead of the gearbox 4, it can likewise be integrated into the starter-generator unit.

It is also particularly advantageous if the dog clutch 6 is integrated into the gearbox 4. The flywheel generator 3 can additionally also be integrated into the gearbox 4. It is furthermore possible to combine the flywheel generator 3 with the friction clutch 2 to form a subassembly and/or to provide the dog clutch 6 in the change-speed gearbox 4.

It is advantageous if the entire unit is designed in such a way in terms of control systems that neutral is selected in the gearbox when the vehicle is stationary in order to connect the centrifugal mass of the flywheel generator 3 to the crankshaft by means of a closed friction clutch 2 and damp the irregularity of the engine.

With the engine running, it is thus possible to charge the vehicle's battery (not shown) with the starter-generator unit as in the case of a conventional generator.

The flywheel generator 3 can furthermore advantageously also be used as a wear-free brake for the vehicle in order to spare the normal service brake. An auxiliary drive function to assist the engine 7 is likewise possible. It is also possible to effect the drive-away process solely with the flywheel generator 3 as the drive, in which case the friction clutch 2 can once again be closed without a difference in speed and hence essentially without wear. In addition to the advantageous reduction in wear in the friction clutch 2, there is, preferably in the passenger-car sector, also an advantageous simplification of the friction clutch 2, which need now only be opened and closed quickly, as it were digitally.

This is particularly advantageous for vehicles that must drive away frequently, such as buses or waste-disposal vehicles.

During braking, the excess energy can be converted into heat in an electrical resistor, this necessitating appropriate cooling measures, and/or the energy can be used to charge the vehicle's battery. The energy can preferably also be used directly to supply storage media, e.g. filling a compressed-air storage device in a truck with compressed air and/or applying wheel brakes with an electric motor in an operation that requires a large amount of current. In this case, the aim is to use a flywheel generator 3 with a minimum possible build-up time, within which the power has risen to 90%, of about 100 ms.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a device with a starter-generator for a vehicle containing an internal combustion engines, the device having a centrifugal mass for stabilizing smoothness of running of the engine, with at least one first non form engaging clutch and a flywheel generator which is actuated by means of an electrical energy source and is effectively connected with a selectable gearbox, wherein the non form engaging clutch is provided between the flywheel generator, and the combustion engine, and wherein the flywheel generator forms the centrifugal mass of the combustion engine, said method comprising the steps of:

before the combustion engine is started, the flywheel generator is decoupled at least from the combustion engine, subsequently the flywheel generator is brought into effective connection with the energy source until the flywheel has reached a specified speed, and the combustion engine is then connected to the flywheel generator by means of the non-form engaging clutch.

2. The method according to claim 1, further comprising the step of:

after the flywheel generator has reached its specified speed, the combustion engine is first of all connected up, and the latter is started by means of the flywheel generator, after which it is briefly disconnected from the flywheel generator again, while the flywheel generator is run down until it is approximately stationary in order to connect up the gearbox, and the combustion engine is connected up again, while the gearbox is shifted to neutral.

3. A method according to claim 1, wherein, for the purpose of driving away, the friction clutch is opened, the gearbox input shaft is braked by the flywheel generator is closed.

4. The method according to claim 3, wherein the flywheel generator is supplied with current after the engagement of the gear, the gearbox input shaft being adjusted to the speed of the combustion engine in such a way that the friction clutch can be closed without a speed difference.

5. The method according to claim 1, wherein, the flywheel generator is used to synchronize the gearbox in driving mode.

6. The method according to claim 1, wherein, in order, to change up a gear, at least one of a gearbox input shaft and the combustion engine is braked by the flywheel generator until a desired lower rotational speed of the gearbox input shaft has been reached.

7. The method according to claim 1, wherein, in order to change down a gear, at gearbox input shaft is accelerated by at least one of the combustion engine and the flywheel generator until a desired higher rotational speed of the gearbox input shaft has been reached.

8. The method according to claim 1, wherein, in order to reverse, the friction clutch is opened, the combustion engine is brought to the idling speed, the flywheel generator is driven in the opposite direction of rotation to that for forward travel and first gear is engaged.

* * * * *